Dec. 15, 1942.   H. HOOVER, JR., ET AL   2,305,384
GEOPHYSICAL PROSPECTING METHOD
Filed May 27, 1940
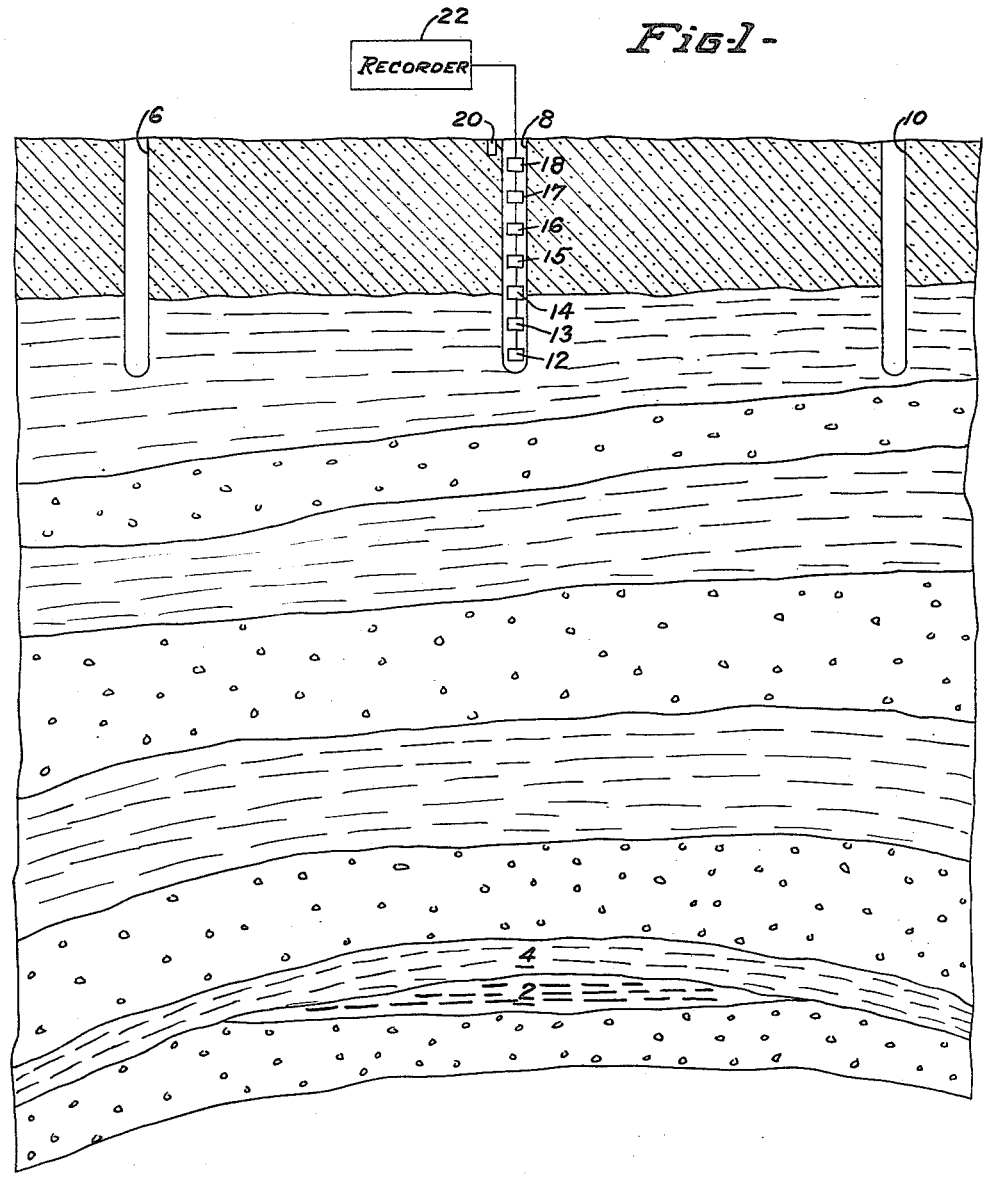
Fig-1-
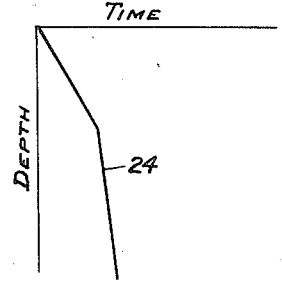
Fig-2-
INVENTOR.
HERBERT HOOVER JR.
BY
AGENT.

Patented Dec. 15, 1942

2,305,384

UNITED STATES PATENT OFFICE 2,305,384

GEOPHYSICAL PROSPECTING METHOD

Herbert Hoover, Jr., Sierra Madre, Calif., assignor to Consolidated Engineering Corporation, Pasadena, Calif., a corporation of California Application May 27, 1940, Serial No. 337,502

3 Claims. (Cl. 23—230)

The present invention relates to a method for prospecting for oil, gas, or other valuable subterranean mineral deposits. My invention relates to a method of detecting minute quantities of significant constituents which have migrated or diffused from a main deposit, for the purpose of locating such a deposit.

It is a characteristic of subterranean deposits to migrate from one point to another by diffusion, or under the influence of geologic forces or movements. As a natural result of these geologic and physical phenomena, concentration of mineral deposits are surrounded by regions bearing minute quantities of such deposits which have migrated from the point of concentration to distant points. In general it may be said that the concentration of migrated or diffused components varies inversely as a function of the distance from the main source or deposit. In addition, of course, the concentration of migrated or diffused components depends on the physical and chemical condition existing at the point within the earth at which such migrated or diffused components are detected, and also on the nature of the strata lying between the main deposit and the point at which migratory or diffused components appear.

In the past, two methods have been used for detecting such diffused constituents in order to ascertain the location of the sources from which the diffused constituents originate.

In one of these methods soil gases have been extracted from points spaced over the surface of the earth by direct evacuation of gases from the ground. Some of the objections to this method are: long times are required for evacuation of appreciable quantities of significant constituents; the volume of space from which the gases are extracted is an unknown quantity; and there is great danger of contamination of the sample with air by suction of the air through the uppermost surface of the soil.

The second method that has been used for detecting soil constituents which have diffused from concentrations of valuable deposits has involved the collection of soil samples at or near the surface of the earth, the subsequent extraction of gases or other significant components from said soil samples and the analysis of said extracted components for significant constituents which have diffused from the main deposits. One of the principal objections to the analysis of soil samples for prospecting purposes lies in the fact that the concentration of significant constituents found in soil samples collected from various points throughout an area under investigation depends not only on the relative position of the points of collection with respect to the position of the deposit from which significant constituents migrate but also upon the physical and chemical characteristics of the collected soil samples. In interpreting the results obtained from the analysis of gases contained within the soil, corrections must be made for such characteristics, such as, for example, the porosity, the adsorbability, the moisture content, and the temperature of the various samples. Great care must also be exercised in this method to take into account effects due to neighboring vegetation or other organic material.

According to my invention I am able to overcome the objections to prior methods used for detecting and measuring significant constituents which have migrated to the surface of the earth from valuable subterranean deposits. My method involves locating the top of the subweathered layer which exists beneath the soil, collecting portions of earth from the subweathered layer at systematically distributed points throughout a region under investigation and analyzing said samples for constituents significant of subterranean deposits. To locate the top of the sub-weathered layer at any sampling position, I measure the values of a characteristic of earth material in place at different depths in the walls of a bore hole at the sampling position, and note the depth at which an abrupt change occurs in said characteristic along the length of the bore hole. I am thus able to locate earth material in each bore hole of substantially the same physical and chemical characteristics, and thus I am able to obtain accurate results free from any of the errors or objections inherent in previously used methods due to irregularities in soil characteristics.

Accordingly, the principal object of my invention is to provide a more effective method for locating subterranean deposits by the detection and analysis of constituents which have migrated from said deposits to remote points.

Another object of my invention is to provide a method of geochemical prospecting in which the concentrations of significant constituents detected in earth samples are substantially free of effects due to variations in the physical characteristics of the earth samples in which the significant constituents are detected.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

My invention may be more readily understood by direct reference to the accompanying drawing, in which Fig. 1 is a vertical section through a portion of the earth to which my method may be applied.

Fig. 2 is a time-depth graph of the uppermost section of the earth.

Referring to Fig. 1, a valuable petroleum deposit 2 is shown trapped beneath the anticlinal portion of a relatively impervious layer 4. Though such trapped hydrocarbons remain in more or less a fixed position over long periods of time, it is an observed fact that small amounts of hydrocarbons, especially the lighter fractions such as methane, ethane, and propane, slowly diffuse upward to the surface through the layers overlying the petroleum deposit. Said migratory constituents may pass upward either through minute fissures existing in the various strata or by slow diffusion through said strata.

While the flow of such migratory constituents from a petroleum deposit is of a dynamic nature, the concentration of said constituents at various points from the commercial deposit is more or less constant over long periods of time. However, this is not true of the concentrations of hydrocarbons in soil, located at the uppermost layer of the earth. The soil is subjected to continual flushing by atmospheric air and continual seepage and percolation of water. As a result, the concentration of significant hydrocarbons which may be present in the soil varies considerably throughout the day and throughout the year. Thus any data obtained by analysis of migratory hydrocarbons which may be present in the soil are subject to large variations, which it so happens may entirely mask regional variations which it is desired to measure.

Beneath the soil or weathered layer throughout any region that might be under investigation there is a subweathered layer of relatively highly consolidated material which has substantially uniform characteristics throughout large areas. This subweathered layer is usually so far below the surface of the earth that its condition is not affected substantially in any way by variations in the temperature or pressure of the atmosphere or by "breathing" of the earth. An additional factor usually present which tends to shield the subweathered layer from the diurnal and seasonal variations which might otherwise influence the hydrocarbon content of said layer is the fact that said layer usually lies well beneath the top of the water table. It is clear, therefore, that the concentrations of hydrocarbons in the subweathered layer depend directly upon the partial pressure of the migratory constituents contained at various points in the subweathered layer and do not vary appreciably because of variation in the characteristics of the subweathered layer from point to point.

According to my invention I locate the top of the subweathered layer preferably by the method shown in United States Patent No. 2,229,191 of January 21, 1941, filed jointly by myself and Hugh C. Schaeffer or by the method shown in United States Patent 2,276,335 of March 17, 1942, filed by Raymond A. Peterson.

In the first of said methods, holes 6, 8, 10, etc., are drilled into the earth at spaced points over the earth's surface. To locate the top of the subweathered layer in each hole, such as hole 8, seismometers 12, 13, 14, 15, 16, 17 and 18 are positioned at closely spaced points therein over a depth range which includes the top of the subweathered layer. Seismic waves generated at a point 20 in substantial alinement with said seismometers are received at said seismometers and the relative times of arrivals recorded on multielement recorder 22. I can readily obtain such data without fracturing the earth to any substantial degree by detonating a very small charge such as a detonating cap at or near the surface of the earth.

From the records of the seismic waves at the various seismometers I make a time-depth curve, or graph, by plotting the depth of the various seismometers as abscissa against the times of arrival of waves at the seismometers as ordinates all as fully set forth in the patent applications hereinabove referred to. The weathered layer is an unconsolidated material in the uppermost portion of the earth in which seismic waves travel with a relatively low and extremely variable velocity. The sub-weathered layer is a consolidated layer beneath the weathered layer and is ordinarily characterized by a high and fairly uniform seismic wave velocity. Although characteristics of the weathered layer such as temperature, porosity, adsorbability and moisture content vary widely from point to point over small areas, the subweathered layer in such an area is of very nearly uniform character with respect to such characteristics.

The top of the subweathered layer is located by a break 24 in the time-depth curve shown in Fig. 2. Knowing the position of the top of the subweathered layer I may then obtain samples of earth within the subweathered layer near the top thereof or at substantially uniform depths therebeneath.

In another way of collecting samples I drill each hole previously used for locating the top of the subweathered layer to a deeper point and collect the earth samples at substantially uniform depths beneath the top of the weathered layer. Then, in order to determine whether the portions of the sub-weathered layer from which I have collected my samples have substantially uniform characteristics I drill each hole deeper and measure the characteristics of the layers in the region from which I have collected my sample such as by the seismic method hereinabove described.

I may also measure the characteristics of the weathered and subweathered layers and hence locate the top of the subweathered layer, by other geophysical methods such as the well known four electrode electrical method in which a vertical log of the resistivity of the earth is determined by electrical measurements made directly at the surface. However, this four electrode method is not as accurate as the seismic methods hereinabove referred to.

When I collect the earth samples I seal them in air tight containers, and transport them to a central laboratory where the samples are analysed for significant migratory constituents. In analyzing such samples for significant constituents, I prefer to use a mass spectrometer rather than any chemical method. The reason for this is simply that the mass spectrometer makes possible the identification of various constituent gases, liquids, or even solids which may be present in the earth samples, and I may, accordingly, make a map showing the distribution of any or each significant constituent rather than merely plotting a map of the total amount of hydrocarbon constituents present in the samples.

From the above explanation of my invention it is clear that by collecting samples of the subweathered layer instead of soil gases or soil samples I am able to obtain measurements of significant migratory constituents present in the earth without the danger of error arising because of wide variations in the soil characteristics from point to point or errors arising by virtue of the continual breathing of the soil or variations in weather.

While I have described my method with particular application to the exploration of the earth for subterranean petroleum deposits it is clear that my method is also applicable to the exploration for other deposits which give rise to constituents which diffuse or migrate slowly outward from the concentrated deposits which it is desired to locate.

In my method I prefer to study the horizontal distribution of normally gaseous saturated hydrocarbons in the subweathered layer. But the results of my method may also be expressed in terms of liquid hydrocarbons or any chemical resulting from the chemical interaction of migratory petroleum constituents with the portions of earth with which it comes in contact.

I claim:

1. The method of prospecting for a subterranean mineral deposit, which comprises drilling bore holes into the earth at systematically distributed sampling positions throughout an area to be prospected, measuring the values of a characteristic of earth material in place at different depths in the walls of each of the bore holes, locating a line of demarcation between the weathered layer and the subweathered layer at each of said positions by determining from said values the depth at which an abrupt change in said characteristic occurs along the length of each of the bore holes, obtaining earth samples from the subweathered layer at each of said positions by collecting an earth sample from each of the bore holes at a depth greater than the depth where said change occurs, and analyzing said samples for the presence of minute concentrations of constituents associated with remote underlying mineral deposit.

2. The method of prospecting for a subterranean mineral deposit underlying a weathered layer, which comprises drilling bore holes into the earth at systematically distributed sampling positions throughout an area to be prospected, measuring the values of a characteristic of earth material in place at different depths in the walls of each of the bore holes, determining from said measurements a sampling depth in each of the bore holes at which the earth material is different from the material of the weathered layer, and is substantially uniform as to said characteristic, collecting earth samples of substantially uniform characteristics by obtaining earth samples from said sampling depths in the respective bore holes, and analyzing said samples for the presence of minute concentrations of constituents associated with remote underlying deposits.

3. The method of prospecting for a subterranean petroleum deposit, which comprises: drilling bore holes into the earth at systematically distributed points throughout an area to be prospected; making a time-depth graph of seismic wave travel in the material traversed by each said bore-hole; locating the top of the subweathered layer at each of said points from a break in the time-depth graph; collecting a sample of matter from each of said bore holes at substantially uniform depths beneath the top of the subweathered layer at the respective distributed points; and analyzing said samples for the presence of minute concentrations of constituents associated with remote underlying petroleum deposits.

HERBERT HOOVER, Jr.